United States Patent [19]

Hamada

[11] 4,367,886
[45] Jan. 11, 1983

[54] WEBBING SUPPORTING STRUCTURE

[75] Inventor: Kozo Hamada, Toyota, Japan

[73] Assignee: Toyota Jidosha Kogyo Kabushiki Kaisha, Toyota, Japan

[21] Appl. No.: 225,358

[22] Filed: Jan. 15, 1981

[30] Foreign Application Priority Data

Mar. 5, 1980 [JP] Japan .............................. 55-28744[U]

[51] Int. Cl.³ ............................................ B60R 21/10
[52] U.S. Cl. .................................................. 280/802
[58] Field of Search ............... 280/802, 804, 803, 808; 297/469

[56] References Cited

U.S. PATENT DOCUMENTS 4,159,834 7/1979 Miller et al. ......................... 280/802
4,256,329 3/1981 Winnale ............................... 280/808
4,310,178 1/1982 Sato .................................... 280/802

*Primary Examiner*—Robert R. Song
*Attorney, Agent, or Firm*—Stevens, Davis, Miller & Mosher

[57] ABSTRACT

A webbing supporting structure used in a seatbelt system wherein one end of a webbing is secured to a door and the other end is secured to substantially the central portion of a vehicle body for automatically fastening webbings to an occupant when the occupant enters the vehicle, is of such an arrangement that the webbing is secured to the door through an anchor plate capable of approaching or receding from the door and, when the door is opened, a wire drives the anchor plate under a door opening force to cause the webbing securing portion to approach the door so as to facilitate actions of the occupant entering or leaving the vehicle, and, when the door is closed, the wire causes the webbing securing portion to approach toward the occupant so as to improve the occupant restraining performance.

4 Claims, 4 Drawing Figures

WEBBING SUPPORTING STRUCTURE

BACKGROUND OF THE INVENTION

1. Field of the Invention

The present invention relates to a webbing supporting structure for supporting an occupant restraining webbing on a door for use in a seatbelt system for protecting an occupant.

2. Description of the Prior Art

There has been proposed a so-called passive seatbelt system in which one end of an occupant restraining webbing is secured to a door, whereby the webbing is caused to approach or recede from a vehicle seat in accordance with a door opening or closing action, so that the webbing can be automatically fastened to or unfastened from the occupant.

In this type of passive seatbelt system, when one end of a lap webbing for restraining a lap of the occupant is engaged with the door, the engaging portion is disposed as high as possible on the door, so that a space for actions of legs of the occupant can be secured when the door is opened. However, in this case, when the webbing is fastened to the occupant upon his closing the door, an anchor point of the lap webbing is disposed high, so that the lap webbing cannot satisfactorily display the occupant restraining performance, thereby presenting such disadvantages that the movement of the occupant in the direction of a collision may cause a secondary collision or damages may be caused to the abdominal region of the occupant.

SUMMARY OF THE INVENTION

The present invention has been developed to obviate the abovedescribed disadvantages and has as its object the provision of a webbing supporting structure in which the engaging portion of the lap webbing does not disturb the actions of the occupant to enter or leave the vehicle, and a proper webbing fastened condition can be obtained when the webbing has been fastened to the occupant after the door is closed.

The webbing supporting structure according to the present invention is of such an arrangement that an anchor plate is supported on the door in a manner to be movable into the vehicle by allowing a webbing securing portion of the anchor plate to approach or recede from the inner surface of the door, so that a proper webbing fastened position can be achieved when the occupant has entered the vehicle, and a connecting member is provided between the anchor plate and the vehicle body, whereby the webbing securing portion of the anchor plate is caused to approach the inner surface of the door when the door is opened, so that actions of the legs of the occupant can be free from any disturbance when the occupant enters or leaves the vehicle.

Description will hereunder be given of an embodiment of the present invention with reference to the drawings.

DESCRIPTION OF THE PREFERRED EMBODIMENT

Figure 1:
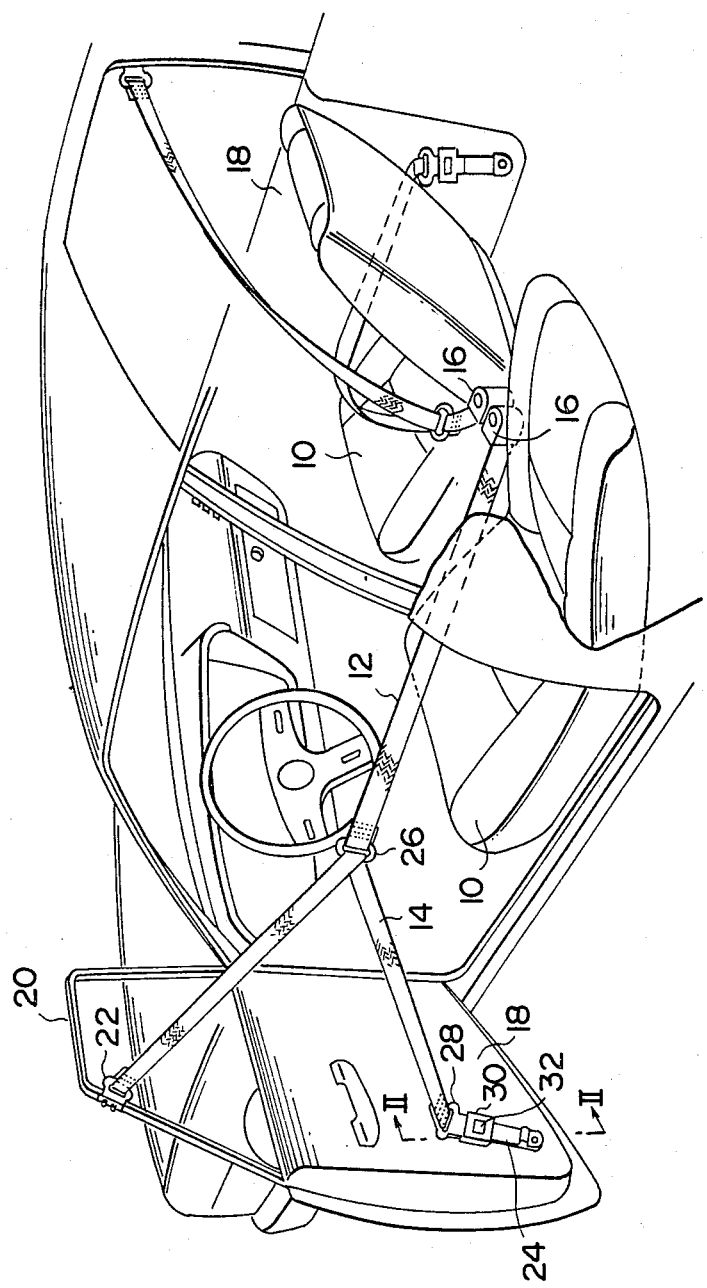
FIG. 1 is a perspective view of the door opened condition showing an embodiment of the webbing supporting structure according to the present invention.

In FIG. 1, an occupant seated at a vehicle seat 10 is to be brought into a three point seatbelt fastened condition by use of an inner webbing 12 and an outer webbing 14. One end of this inner webbing 12 is wound into a retractor 16 provided at substantially the central portion of the vehicle. This retractor 16 is adapted to wind up the inner webbing 12 by a biasing force and incorporates therein an inertia lock mechanism for abruptly stopping the windout of the inner webbing 12 in an emergency of the vehicle.

On the other hand, the outer webbing 14 is secured at one end thereof to a window frame 20 of a door 18 through an anchor plate 22, and secured at the other end thereof to the lower portion of the door 18 through an anchor plate 24. The intermediate portion of the outer webbing 14 is turned back at a through-ring 26 provided at the forward end of the inner webbing 12.

Figure 2:
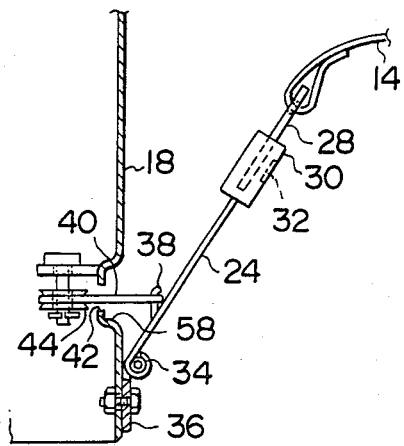
FIG. 2 is a sectional view showing the door closed condition corresponding to a sectional view taken along the line II—II in FIG. 1.
Figure 3:
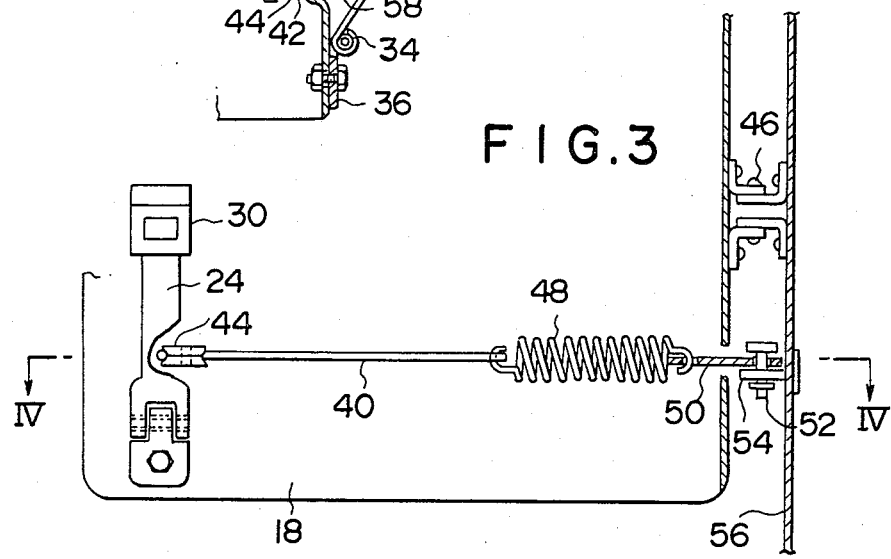
FIG. 3 is a side view of FIG. 2.

Further, detailed description will now be given of securing of the lower end of the outer webbing 14 to the door 18. As shown in FIG. 2, a tongue plate 28 is secured to the lower end of the outer webbing 14, and this tongue plate 28 is engaged with a buckle device 30 solidly secured to the forward end of the anchor plate 24. Provided on this buckle device 30 is a release button 32 for releasing the outer webbing 14 for allowing the occupant to escape from the vehicle to outside in an emergency of the vehicle.

A base of the anchor plate 26 to which this buckle device 30 is secured is pivotally supported on a base 36, which is secured to the inner surface of the door, through a shaft 34. This shaft 34 is disposed along with the inner surface of the door, i.e., directed in the longitudinal direction of the vehicle when the door 18 is closed, that is substantially horizontal, whereby, when the anchor plate 24 is turned about the shaft 34, the tongue plate 28, which is connected to the lower end of the outer webbing 14, moves downwardly and away from the inner surface of the door 18.

Figure 4:
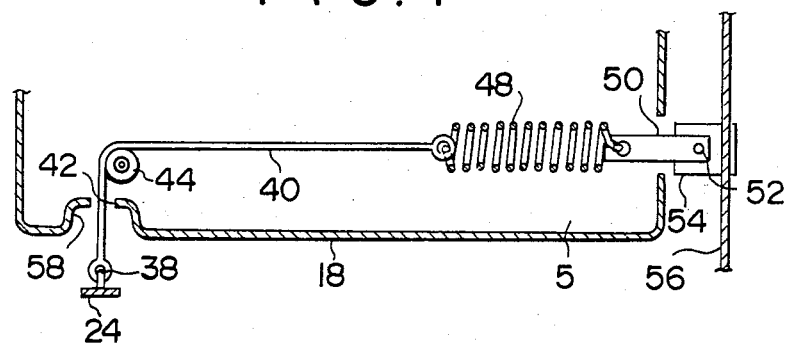
FIG. 4 is a sectional view taken along the line IV—IV in FIG. 3.

A hook 38 is projected toward the inner surface of the door 18 from the intermediate portion of this anchor plate 24 and engages one end of a wire 40 constituting a connecting member. As shown in FIG. 4, the intermediate portion of this wire 40 is received in the door 18 through an opening 42, wound around a pulley 44 pivotally supported in the door 18, bent in this longitudinal axial line in the perpendicular direction, led toward a door hinge 46 and secured at the forward end thereof to one end of a tensile coil spring 48.

The other end of this tensile coil spring 48 is connected to a plate 50 which is projected through the door 18 and pivotally supported on a front pillar 56 constituting part of the vehicle body through a pin 52 and a braket 54. Here, the pin 52 is interposed between the forward end of the door 18 in the vehicle and the front pillar 56, whereby, when the door 18 is opened, a space is formed between the forward end of the door 18 and the front pillar 56, so that a tensile force can act on the wire 40.

In addition, as shown in FIG. 4, a recess 58 is formed at a portion of the surface of the door 18 at the compartment's side corresponding to the anchor plate 24, so that the hook 38 projected from the anchor plate 24 can be received therein.

Description will now be given of action of the present embodiment with the abovedescribed arrangement.

In the case the occupant opens the door 18 when he wants to enter the vehicle, as shown in FIG. 1, the inner webbing 12 is wound out of the retractor 16 and the inner and outer webbings 12 and 14 are moved forward in the vehicle in accordance with the opening circularly arcuate motion of the door 18, so that a space for the occupant to enter the vehicle can be formed between the webbings and the seat 10.

Simultaneously with the above, a tensile force is generated in the wire 40 with the increase in the space formed between the forward end of the door 18 and the front pillar 56, whereby the wire 40 turns the anchor plate 24 about the shaft 34, so that the anchor plate 24 and tongue plate 28 can be attached close to the inner surface of the door 18. Consequently, the anchor plate 24 and the outer webbing 14 do not disturb the moving actions of the legs of the occupant, so that the occupant can comfortably ride in the vehicle. Additionally, the anchor plate 24 and the buckle device 30 can be closely attached to the inner surface of the door 18 when the door 18 is opened through a predetermined angle, and when the door 18 is opened beyond the predetermined angle, the tensile coil spring 48 is deflected to absorb an over-stroke of the plate 50.

When the occupant closes the door upon being seated, the remaining portion of the inner webbing 12 is wound into the retractor 16 and the webbings 12 and 14 are moved rearward in the vehicle in accordance with the closing circularly arcuate motion of the door 18, so that the webbings 12 and 14 can be automatically fastened to the occupant.

When the webbings are fastened to the occupant, the space formed between the door 18 and the front pillar 56 is decreased, whereby the tensile force acting on the wire 40 is reduced or eliminated, so that the anchor plate 24 can move into the compartment. Furthermore, the biasing force of the retractor 16 for winding up the inner webbing 12 acts on the webbings 12 and 14 as a tensile force, with the result that, as shown in FIG. 2, the anchor plate 24 and the buckle device 30 turn about the shaft 34 to move toward the occupant, whereby the webbings 12 and 14 are closely attached to the occupant, thus leading to a condition where no slack is formed between the webbings and the occupant.

When the vehicle has fallen into an emergency such as a collision, the inertia lock mechanism in the retractor 16 positively stop the windout of the inner webbing 12 while the webbings 12 and 14 are fastened to the occupant in the condition of having no slack through the agency of the anchor plate 24, whereby the occupant is reliably restrained by the webbings 12 and 14 without dashing against dangerous obstacles, thereby enabling to hold the occupant in safety.

In the case the occupant escapes from the vehicle to outside after the collision of the vehicle, if he presses the release button 32 of the buckle device 30 to cause the tongue plate 28 to fall off, then the occupant can unfasten the webbings from himself and open the door 18 to readily escape from the vehicle to outside.

Also, when the occupant opens the door 18 upon completion of the normal running condition of the vehicle, the anchor plate 24 and the buckle device 30 approach the inner surface of the door 18 in the same manner as in the actions of the occupant entering the vehicle, whereby the actions of legs of the occupant in leaving the vehicle are not disturbed, thereby enabling the occupant to comfortably leave the vehicle.

Description will hereunder be given of the mechanical strength of the tensile coil spring 48 and the dimensions of the wire 40. It is necessary that the biasing force of the tensile coil spring 48 should be larger in value than the biasing force of the retractor 16 when the door 18 is opened, and, when the door 18 is closed, it is necessary that the winding biasing force of the retractor 16 should be larger in value than the biasing force of the tensile coil spring 48 or the tensile coil spring 48 is in a closely attached condition, whereby the wire 40 has only a very weak tensile force, so that the anchor plate 24 of the retractor 16 can be turned toward the vehicle seat. To secure the reliable action as described above, a very weak tensile coil spring may be provided at the intermediate portion of the wire 40 to prevent the wire 40 from being slackened when the door is closed and also a stopper may be provided to prevent the tensile coil spring from being stretched beyond a predetermined value.

As has been described hereinabove, the webbing supporting structure according to the present invention is of such an arrangement that the anchor plate is caused to approach or recede from the door in accordance with the opening or closing action of the door, and hence, can offer such outstanding advantages that the occupant restraining performance can be improved while the space for the legs of the occupant is secured when the occupant enters or leaves the vehicle.

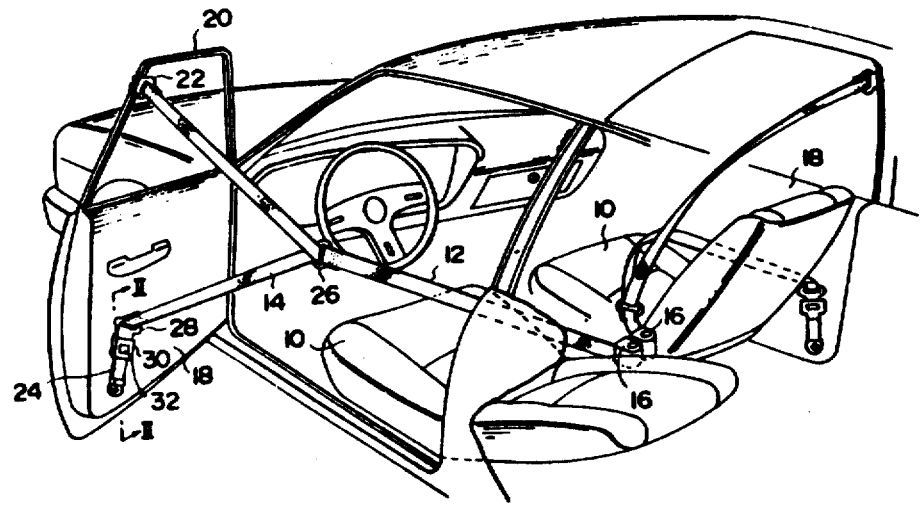

What is claimed is:

1. A webbing supporting structure for use in a seatbelt system for automatically fastening webbings to an occupant upon his entering a vehicle, comprising:
    (a) an outer webbing secured at one end thereof to the upper portion of a door,
    (b) an inner webbing movably connected to an intermediate portion of said outer webbing and windable upon a retrator,
    (c) a rigid anchor plate connected with the other end of said outer webbing, said anchor plate being pivotably supported on a base connected to a lower rear portion of the door, said anchor plate being pivotably supported on said base about a substantially horizontal shaft extending along the inner surface of the door,
    (d) a wire connected at one end thereof with the intermediate portion of said rigid anchor plate and extending into the door through an opening in an inner surface of the door,
    (e) a spring interposed between the other end of said wire and a vehicle body, a first tensile force of said spring at the time when the door is open being larger than an opposite force at the intermediate portion of said anchor plate caused by a winding force of said retractor and a second tensile force of said spring at the time when the door is closed being smaller than the opposite force,
    whereby when the door is opened, said first tensile force of said spring allows said anchor plate to approach the door so as to facilitate the actions of the occupant entering or leaving the vehicle, and when the door is closed, said anchor plate moves away from the door by the winding force of said retractor so as to restrain the occupant.

2. A webbing supporting structure as set forth in claim 1, wherein said second tensile force is substantially zero.

3. A webbing supporting structure as set forth in claim 1 further comprising a hook projecting from the intermediate portion of said rigid anchor plate toward the door and connected with said wire.

4. A webbing supporting structure as set forth in claim 3, further comprising a recess in the inner surface of the door for receiving said hook when said rigid anchor plate is moved close to the inner surface of the door.

* * * * *

UNITED STATES PATENT AND TRADEMARK OFFICE
CERTIFICATE OF CORRECTION

PATENT NO. : 4,367,886

DATED : January 11, 1983

INVENTOR(S) : Kozo Hamada

It is certified that error appears in the above-identified patent and that said Letters Patent is hereby corrected as shown below:

The title page should be deleted to appear as per attached title page.

Signed and Sealed this

Twenty-sixth Day of April 1983

[SEAL]

Attest:

GERALD J. MOSSINGHOFF

Attesting Officer

Commissioner of Patents and Trademarks

United States Patent [19]

Hamada

[11] 4,367,886

[45] Jan. 11, 1983

[54] WEBBING SUPPORTING STRUCTURE

[75] Inventor: Kozo Hamada, Toyota, Japan

[73] Assignee: Toyota Jidosha Kogyo Kabushiki Kaisha, Toyota, Japan

[21] Appl. No.: 225,358

[22] Filed: Jan. 15, 1981

[30] Foreign Application Priority Data

Mar. 5, 1980 [JP] Japan .................. 55-28744[U]

[51] Int. Cl.³ .............................................. B60R 21/10
[52] U.S. Cl. .................................................. 280/802
[58] Field of Search ............ 280/802, 804, 803, 808; 297/469

[56] References Cited

U.S. PATENT DOCUMENTS

| | | | |
|---|---|---|---|
| 4,159,834 | 7/1979 | Miller et al. | 280/802 |
| 4,256,329 | 3/1981 | Winnale | 280/808 |
| 4,310,178 | 1/1982 | Sato | 280/802 |

*Primary Examiner*—Robert R. Song
*Attorney, Agent, or Firm*—Stevens, Davis, Miller & Mosher

[57] ABSTRACT

A webbing supporting structure used in a seatbelt system wherein one end of a webbing is secured to a door and the other end is secured to substantially the central portion of a vehicle body for automatically fastening webbings to an occupant when the occupant enters the vehicle, is of such an arrangement that the webbing is secured to the door through an anchor plate capable of approaching or receding from the door and, when the door is opened, a wire drives the anchor plate under a door opening force to cause the webbing securing portion to approach the door so as to facilitate actions of the occupant entering or leaving the vehicle, and, when the door is closed, the wire causes the webbing securing portion to approach toward the occupant so as to improve the occupant restraining performance.

4 Claims, 4 Drawing Figures